March 19, 1935. M. A. MEAD 1,994,780
FRUIT WASHER
Filed July 27, 1932 2 Sheets-Sheet 1
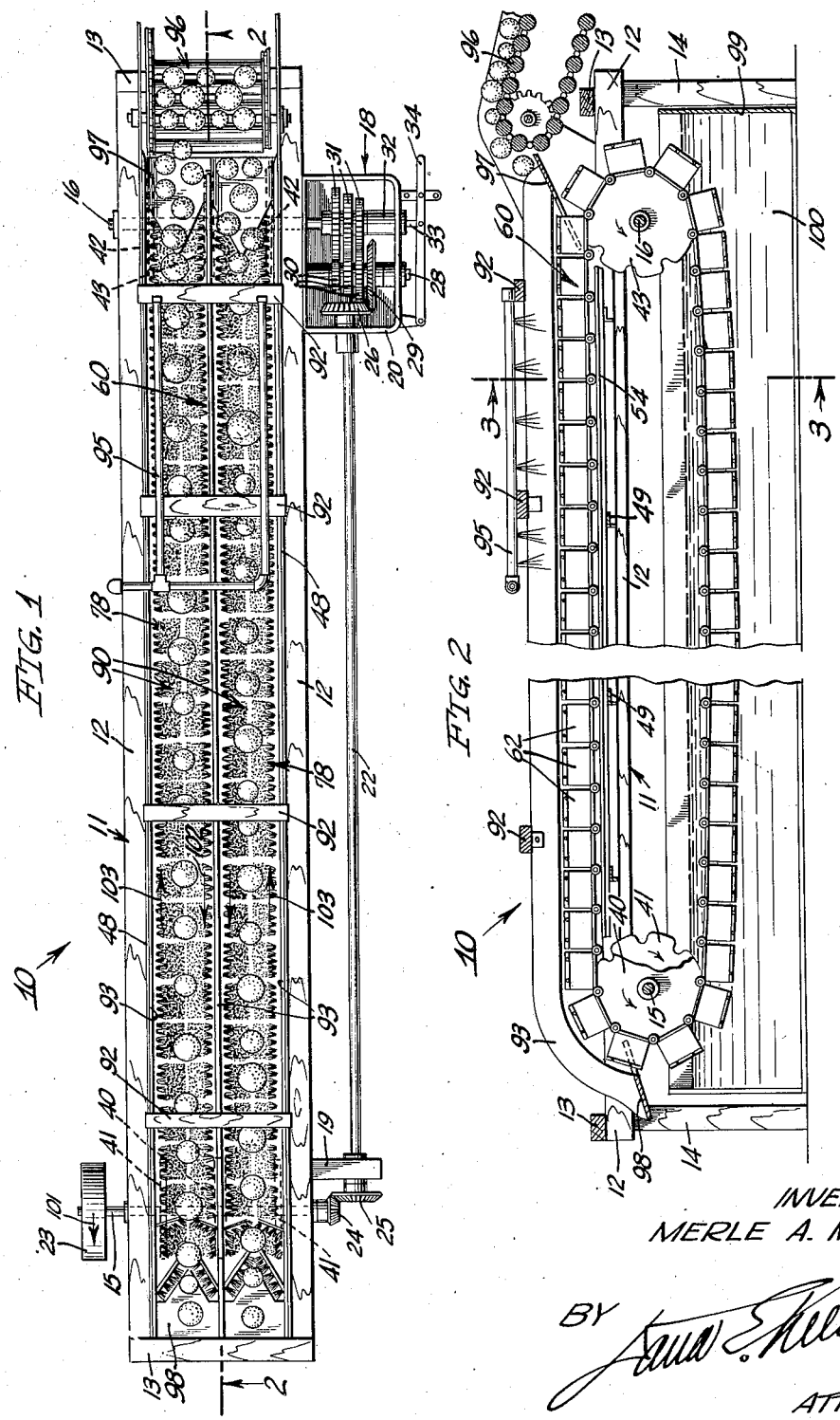
INVENTOR
MERLE A. MEAD
ATTORNEY

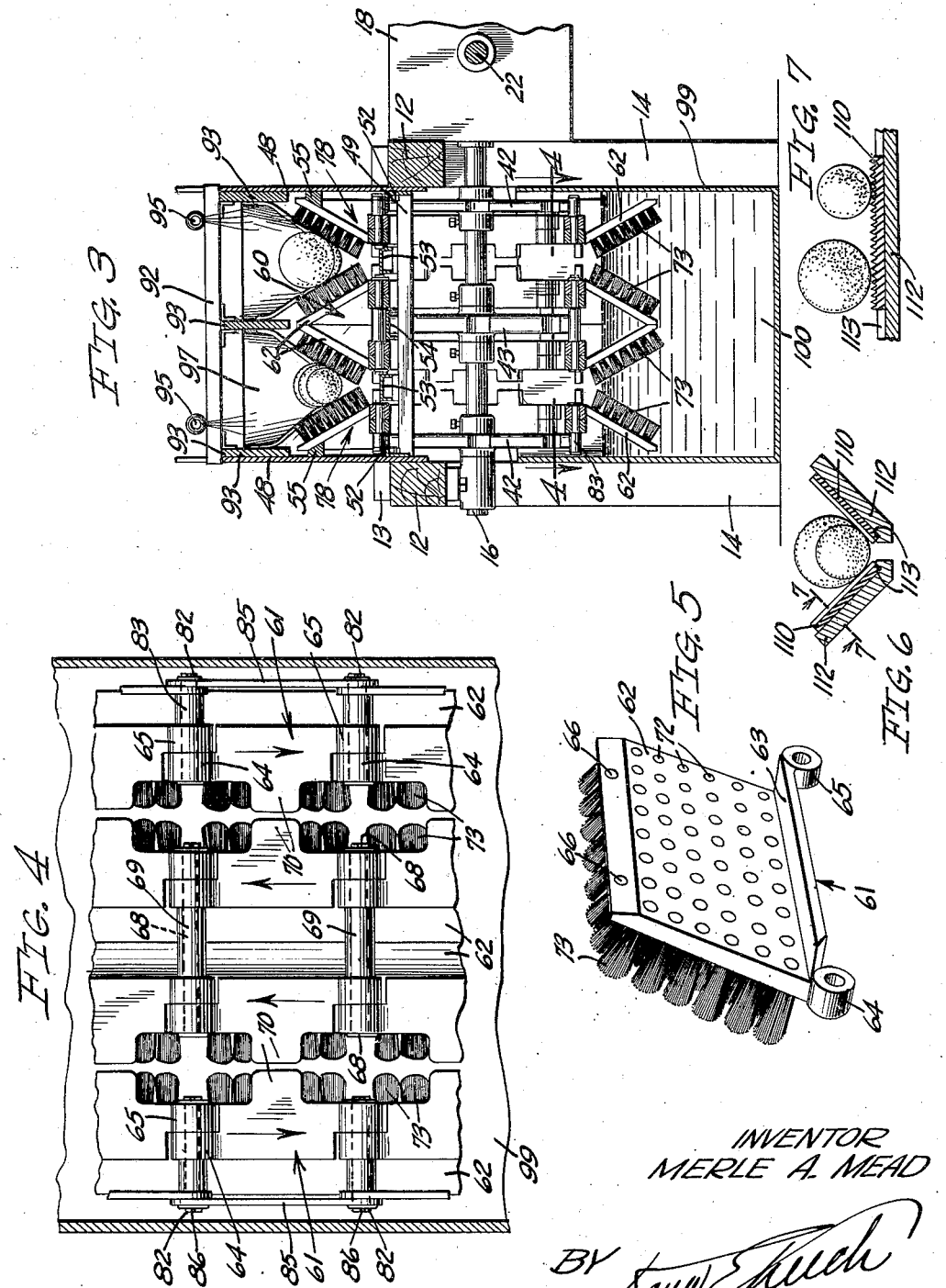

Patented Mar. 19, 1935

1,994,780

UNITED STATES PATENT OFFICE 1,994,780

FRUIT WASHER

Merle A. Mead, Pomona, Calif.

Application July 27, 1932, Serial No. 624,933

9 Claims. (Cl. 146—202)

My invention relates to apparatus for handling fruit and vegetables incidental to washing, polishing, drying, or otherwise treating these products, and is particularly useful in the washing of citrus fruit in preparing these for market.

In preparing certain fruits and vegetables for market it is necessary to wash these thoroughly before they are packaged for marketing. In some instances the product after being washed is mechanically dried, and it is the present custom to polish certain products such as citrus fruits before these are sorted for surface characteristics, sized, wrapped, and packed into boxes for shipment.

It is an object of my invention to provide a machine for accomplishing one or more of the aforementioned functions in an efficient and satisfactory manner.

In some citrus growing sections scale conditions are such as to form a thin black crust over the outer surface of the fruit which is exceedingly difficult to remove. Smudge produced by orchard heating also sometimes covers the fruit with soot so that the cleaning of the fruit becomes a major problem in preparing the fruit for market.

It is accordingly an object of my invention to provide a fruit washer having a very effective scrubbing action on the fruit so as to clean scaly or sooty fruit.

It is yet another object of my invention to provide a fruit washer which is simple and relatively inexpensive in construction and which will wash fruit with a relatively high efficiency and yet without damage to the fruit.

The manner of accomplishing the foregoing objects, as well as further objects and advantages, will be made apparent in the following description taken in connection with the accompanying drawings, in which:

Fig. 1 is a plan view of a preferred embodiment of my invention comprising a double run washer.

Fig. 2 is a longitudinal sectional view taken on the line 2—2 of Fig. 1.

Fig. 3 is a transverse sectional view taken on the line 3—3 of Fig. 2.

Fig. 4 is an enlarged detailed horizontal sectional view taken on the line 4—4 of Fig. 3.

Fig. 5 is an enlarged perspective view of one of the brush back members utilized in my invention.

Fig. 6 is a fragmentary vertical sectional view showing a modification of my invention.

Fig. 7 is a fragmentary sectional view taken on the line 7—7 of Fig. 6.

Referring specifically to the drawings, the embodiment of my invention shown therein comprises a fruit washer 10 having a frame 11, this frame including longitudinal members 12, cross-members 13, and legs 14. Journalled in suitable bearings provided on the longitudinal members 12 are primary and secondary shafts 15 and 16, these shafts being connected by a transmission 18. The transmission 18 includes a bearing 19 and gear box 20 which are fixed upon one of the frame members 12, there being a shaft 22 journalled in this bearing and gear box. The shaft 15 has a pulley 23 fixed upon one end thereof and a pinion 24 on the other end, this pinion meshing with a bevel gear 25 provided on the adjacent end of the shaft 22. On the opposite end of the shaft 22 in the gear box 20 is fixed a gear 26. Journalled in the gear box 20 is a countershaft 28 having fixed thereon a bevel gear 29, which meshes with the gear 26, and a number of other gears 30 of varying diameters. The gears 30 mesh continually with complementary gears 31 which are mounted to rotate on a tubular extension 32 of the shaft 16. A clutch mechanism 33 operated by a handle 34 is adapted to connect one or the other of the gears 31 with the shaft 16, so that when the shaft 15 is driven by the pulley 23 the shaft 16 is driven in the opposite direction at a definite speed ratio. Whatever the ratio is that the transmission 18 drives the shaft 16, this shaft always rotates at a lower speed than that of the shaft 15.

Fixed upon the shaft 15 is a drive sprocket 40, while rotatably mounted on this shaft are idle sprockets 41. Fixed upon the secondary shaft 16 are drive sprockets 42, while idly rotatable on this shaft is an idle sprocket 43.

Secured upon inner faces of the frame members 12, as shown in Fig. 3, are side wall plates 48 between which are mounted rail supports 49. Supported on the rail supports 49 are outer rails 52 and inner rails 53 and 54, the rail 54 being in the middle and the rails 53 and 52 being symmetrically disposed outwardly therefrom, as clearly shown in Fig. 3. Also provided on the plates 48 are upper rails 55.

Trained about the sprockets 40 and 43, so that the upper flight thereof rests upon the rails 53 and 54, is an endless chain belt 60. The chain belt 60 is made up of links 61, each of which includes a pair of brush backs 62, each of the latter having an inwardly extending flange 63 at its lower end, and hinge eyes 64 and 65. The pair of brush backs 62 in each of the links 61 are bolted together by suitable stove bolts extended through holes 66 along the upper edge of these brush backs. The eyes 64 of each link 61 are connected to the eyes 65 of an adjacent link by a pin 68, as shown in Fig. 4, the eyes 65 being spaced by a roller 69 rotatably mounted on this pin. The rollers 69 of the link belt 60 are supported on the track 54 when they are disposed in the upper flight of this belt. Formed laterally from each of the brush backs 62 is a slide lug 70, the lugs 70 which extend from opposite sides of each of the links 61 riding on top of the inner edges of the tracks 53 when this link is disposed in the upper flight of the chain belt 60. Each of the brush backs 62 is provided with bristle apertures 72 in which are mounted bristles 73, the outer surface of which may have any desired configuration, such as vertical ridges or curves, or they may be flat to provide a continuous flat surface, as shown in the drawings.

Trained about the sprockets 41 and 42 is a pair of endless chain belts 78 which are formed of links 79. Each of the links 79 includes a brush back 62, the eyes 64 and 65 of adjacent links being connected together by pins 82, there being a sleeve roller 83 similar in diameter to the roller 69 but approximately half as long rotatably mounted on each of the pins 82 adjacent the eye 65. Connecting the extending ends of the pins 82 are link plates 85, these being retained in place by suitable cotter pins 86. The rollers 83 of the chain belt 78 ride upon the tracks 52, while the lugs 70 of these chain belts ride upon outer edges of the tracks 53. The brush backs 62 of the chain belt 78 when in the upper flight thereof are supported by the upper tracks 55, as clearly shown in Fig. 3.

It is thus seen that the bristles 73 of the upper flights of chain belts 60 and 78 form a pair of fruit run-ways 90. It is also to be noted that the walls formed by these bristles are inclined at a relatively steep angle to the horizontal. Supported on suitable cross-members 92, the opposite ends of which are secured to the plates 48, are fruit guards 93 which extend the length of the washer 10 and are disposed directly over the brush backs 62 of the endless chain belts 60 and 78 so as to prevent fruit from riding on top of these chain belts. Also supported on the cross-members 92 is a system of pipes 95 which are apertured for the delivery of a treating liquid onto the fruit as it travels along the channels 90.

The washing machine 10 is provided with a fruit delivery conveyor 96 which delivers fruit over a drop board 97 into the channels 90 substantially over the shaft 16. At the opposite end of the machine a drop board 98 is provided for receiving the fruit from the run-ways 90 and delivering the fruit to any suitable conveyor or other device for receiving it.

Disposed beneath the machine 10 is a tank 99 having therein a solution 100 of cleaning liquid, this tank being so disposed that the brush backs 62 and bristles 73 of the conveyors 60 and 78 pass through the liquid 100 when these brush backs are in the lower flights of these chain belts.

The operation of my washing machine is as follows: The pulley 23 is connected to any suitable source of power, as by a belt, so that this pulley is rotated in the direction of the arrow 101. This causes the chain belt 60 to travel in the direction of the arrow 102, and the chain belts 78 to travel in the direction of the arrows 103. The pipe system 95 is connected to a pump so as to pump cleaning liquid 100 from the tank 99 and discharge this in a spray onto the brushes of the chain belts 60 and 78. The conveyor 96 is now set in operation so as to deliver fruit onto the drop board 97, this fruit rolling into the channels 90. Owing to the fact that the chain belt 60 travels at a faster rate of speed than the chain belt 78, the fruit thus delivered to these channels 90 travels in the direction of the arrow 102 until it is discharged onto the drop board 98 at the opposite end of the machine. While travelling along the channels 90 the fruit is rotated rapidly and scrubbed by the bristles 73. This results in a thorough scouring and cleansing of the outer surface of the fruit.

The comparatively steep angle at which the surface of the bristles 73 is disposed relative to the horizontal is an important factor in the remarkably efficient scrubbing action which takes place in the washing machine 10. I have found in practice that the dirtiest fruit obtainable when run through my machine comes out entirely clean.

While I have shown the brush backs 62 as themselves forming the links of the chain belts 60 and 78, it is to be understood that these brush backs may be supported upon attachment links on standard link chains if it is desired to do this. It is also to be understood that while I have referred to my invention as a washer and may so refer to it in the claims, nevertheless this invention may be used without the liquid 100 in the tank 99 and with relatively soft bristles 73 in the brush backs 62 for the purpose of drying the fruit passed therethrough, or it may thus be used to apply a coat of wax to fruit, already dried, and to polish the surface of the fruit thus waxed. Thus, wherever the term "washer" is used herein in describing or defining my invention, it is to be understood to apply to my invention regardless of the use to which it is put in the treating of fruit or vegetables or other objects capable of being fed along the channels 90.

It is also to be understood that my washer is adapted to have rubber bristles in place of the bristles 73, in which case the fruit may be "dry cleaned" by my machine.

The fruit washer 10 can be converted into a very effective fruit drier by replacing the sprocket wheels 40, 41, 42, and 43 with suitable pulley wheels (not shown) about which flexible rubber belts 110, shown in Figs. 6 and 7 are adapted to be trained. The upper surfaces of the belts 110 are preferably formed to provide transverse serrations as shown, it being understood that common flat belts might also be used, or belts whose surfaces are provided with any other desirable configuration. The upper flights of the belts 110 are supported at an angle of about 45° by longitudinal boards 112, the latter having shoulders 113 adjacent the lower edge thereof which contact the lower edges of the belts 110.

When the washer 10 is to be used as a drier it is understood that the lower flights of the belts 110 do not run in fluid, the tank 99 shown in Fig. 3 being replaced by a relatively shallow pan for the purpose of catching water which is removed from the fruit as it is being dried.

The belts 110 move in opposite directions at different speeds in a manner identical with the movements of the belts 60 and 78 of the machine 10, and the fruit carried by the belts 110 is revolved at a sufficient speed to throw the water from the fruit by centrifugal force.

What I claim is:

1. In a fruit washer the combination of: two endless belts disposed alongside each other, said belts having fruit cleaning faces inclined towards each other to form a fruit trough opening upwardly; means for moving said belts in opposite directions, one of said belts moving faster than the other, so that fruit fed into said trough will be rotated and cleaned by said belts and said fruit will travel along said trough in the direction of the faster belt; means for feeding fruit into one end of said trough; and means for receiving fruit from the opposite end of said trough.

2. In a fruit washer the combination of: two endless belts disposed alongside each other, said belts having fruit cleaning faces inclined towards each other at angles of forty degrees or more from the horizontal to form a fruit trough opening upwardly; means for moving said belts in opposite directions at different speeds so that fruit fed into said trough will be rotated and cleaned by said belts; means for feeding fruit into one end of said trough; and means for receiving fruit from the opposite end of said trough.

3. In a fruit washer the combination of: two endless belts disposed alongside each other, said belts having bristle brush fruit cleaning faces inclined towards each other at angles of forty degrees or more from the horizontal to form a fruit trough opening upwardly; means for moving said belts in opposite directions, one of said belts moving faster than the other, so that fruit fed into said trough will be rotated and cleaned by said belts and said fruit will travel along said trough in the direction of the faster belt; means for feeding fruit into one end of said trough; and means for receiving fruit from the opposite end of said trough.

4. In a fruit washer the combination of: primary and secondary shafts; means for rotating said shafts in opposite directions; a plurality of endless belt means mounted on said shafts, alternate belt means being driven by one of said shafts and the balance of said belt means being driven in the opposite direction by the other of said shafts; cleaning means on said belt means forming fruit troughs between adjacent belt means, said troughs opening upwardly; means for driving one of said shafts from the other at varying speed ratios; means for feeding fruit into said trough at one end of said washer; and means for receiving fruit from said trough at the opposite end of said washer.

5. In a fruit washer the combination of: two endless flexible belts, said belts having fruit supporting faces inclined towards each other to form a fruit trough facing upwardly; means for moving said belts in opposite directions at different speeds so that fruit fed into said trough will be rotated and fed along said trough by said belts; means for feeding fruit into one end of said trough; and means for receiving fruit from the opposite end of said trough.

6. In a fruit washer the combination of: two endless flexible belts, said belts having fruit supporting faces inclined towards each other to form a fruit trough facing upwardly; means for moving said belts in opposite directions so that fruit fed into said trough will be rotated and fed along said trough by said belts; a plurality of yieldable fruit engaging means extending from the trough forming surface of one of said belts; means for feeding fruit into one end of said trough; and means for receiving fruit from the opposite end of said trough.

7. In a fruit washer the combination of: two endless flexible belts, said belts having fruit supporting faces inclined towards each other to form a fruit trough facing upwardly; means for moving said belts in opposite directions so that fruit fed into said trough will be rotated and fed along said trough by said belts; a plurality of flexible ridges formed on a trough forming surface of one of said belts and extending across the direction of travel thereof; means for feeding fruit into one end of said trough; and means for receiving fruit from the opposite end of said trough.

8. In a fruit washer the combination of: two endless flexible belts, said belts having fruit supporting faces inclined towards each other to form a fruit trough facing upwardly; means for moving said belts in opposite directions so that fruit fed into said trough will be rotated and fed along said trough by said belts; a plurality of yieldable fruit engaging means extending from the trough forming surfaces of both of said belts; means for feeding fruit into one end of said trough; and means for receiving fruit from the opposite end of said trough.

9. In a fruit washer the combination of: two endless flexible belts, said belts having fruit supporting faces inclined towards each other to form a fruit trough facing upwardly; means for moving said belts in opposite directions so that fruit fed into said trough will be rotated and fed along said trough by said belts; a plurality of flexible ridges formed on the trough forming surfaces of both of said belts and extending across the direction of travel thereof; means for feeding fruit into one end of said trough; and means for receiving fruit from the opposite end of said trough.

MERLE A. MEAD.